United States Patent
Cannon et al.

[19]

[11] Patent Number: 6,085,583
[45] Date of Patent: Jul. 11, 2000

[54] SYSTEM AND METHOD FOR ESTIMATING VOLUME OF MATERIAL SWEPT INTO THE BUCKET OF A DIGGING MACHINE

[75] Inventors: Howard Cannon, Mossville, Ill.; Sanjiv Singh, Pittsburgh, Pa.

[73] Assignee: Carnegie Mellon University, Pittsburgh, Pa.

[21] Appl. No.: 09/317,791

[22] Filed: May 24, 1999

[51] Int. Cl.⁷ .................................................. G01F 19/00
[52] U.S. Cl. .................................................. 73/149; 37/413
[58] Field of Search ................................ 73/149; 37/413; 414/698, 699

[56] References Cited

U.S. PATENT DOCUMENTS

| | | | |
|---|---|---|---|
| 3,375,597 | 4/1968 | Michael | 37/413 |
| 5,446,980 | 9/1995 | Rocke | 37/348 |
| 5,461,803 | 10/1995 | Rocke | 37/443 |
| 5,528,843 | 6/1996 | Rocke | 37/348 |
| 5,682,312 | 10/1997 | Rocke | 364/424.07 |
| 5,933,346 | 8/1999 | Brabec et al. | 414/698 |

FOREIGN PATENT DOCUMENTS

| | | | |
|---|---|---|---|
| 135417 | 1/1961 | U.S.S.R. | 37/413 |
| 371322 | 2/1973 | U.S.S.R. | 37/413 |

*Primary Examiner*—Robert Raevis
*Attorney, Agent, or Firm*—Blackwell Sanders Peper Martin

[57] ABSTRACT

A method is disclosed for monitoring a work implement of a digging machine positioned at an excavation site during an excavating work cycle, the work implement including a bucket for capturing material, the method comprising the steps of using a representation of the shape of the excavation site and estimating the volume of material captured by the bucket based on the actual trajectory of the bucket and the shape of the excavation site to determine when the bucket has reached a desired capacity.

20 Claims, 3 Drawing Sheets ive or digging machines such as hydraulic machines, excavators, backhoes, and front shovels are commonly used in the areas of construction, mining, and excavation. These excavating machines have work implements which consist of boom, stick, and bucket linkages. The boom is pivotally attached to the excavating machine at one end and its other end is pivotally attached to a stick. The bucket is pivotally attached to the free end of the stick. Each work implement linkage is actuated by at least one hydraulic cylinder for movement. The work implements are manipulated to perform a sequence of distinct functions which constitute a complete excavation work cycle. In particular, a typical excavating operation or work cycle may consist of large hydraulic machinery filling the bucket with material, such as soil, transporting the loaded bucket to a truck or conveyer belt, and unloading the material into a truck bed or onto the belt.

In some situations it would be advantageous to determine when a bucket, associated with the excavating or digging machine, is full in order for the efficiency of the machine be kept at a high level. For example, if the bucket is full then any additional motion of the bucket through the ground would waste time and energy thus lowering the efficiency of the machine. Also, if the bucket is not filled to its capacity then efficiency suffers because more digging operations will be required. In other situations, because of the construction or orientation of the particular digging machine, it is impossible for the operator of the machine to see when the bucket is full. In this case, it is desirable to have some indication of when the bucket has reached desired capacity so that the operator knows to stop the digging process.

Accordingly, the present invention is directed to overcoming one or more of the problems as set forth above.

DISCLOSURE OF THE INVENTION

One embodiment of the invention is a method for monitoring a work implement of a digging machine positioned at an excavation site during an excavating work cycle, the work implement including a bucket for capturing material, the method comprising the steps of using a representation of the shape of the excavation site and estimating the volume of material captured by the bucket based on the actual trajectory of the bucket and the shape of the excavation site to determine when the bucket has reached a desired capacity.

Another embodiment of the present invention is a method for monitoring a work implement of a digging machine positioned at an excavation site during an excavating work cycle, the work implement including a bucket, the method comprising the steps of producing a topological map of the excavation site to be excavated prior to commencing operation of the work implement and estimating the swept volume of the bucket given the actual trajectory of the bucket and the shape of the excavation site.

A further embodiment of the present invention is a method for monitoring a work implement of a digging machine positioned at an excavation site during an excavating work cycle, the work implement including a bucket, the method comprising the steps of producing a topological map of the initial excavation site, determining the position of the work implement, and estimating the volume of material captured by the bucket to determine when the bucket has reached a desired capacity.

BEST MODE FOR CARRYING OUT THE INVENTION

Figure 1:
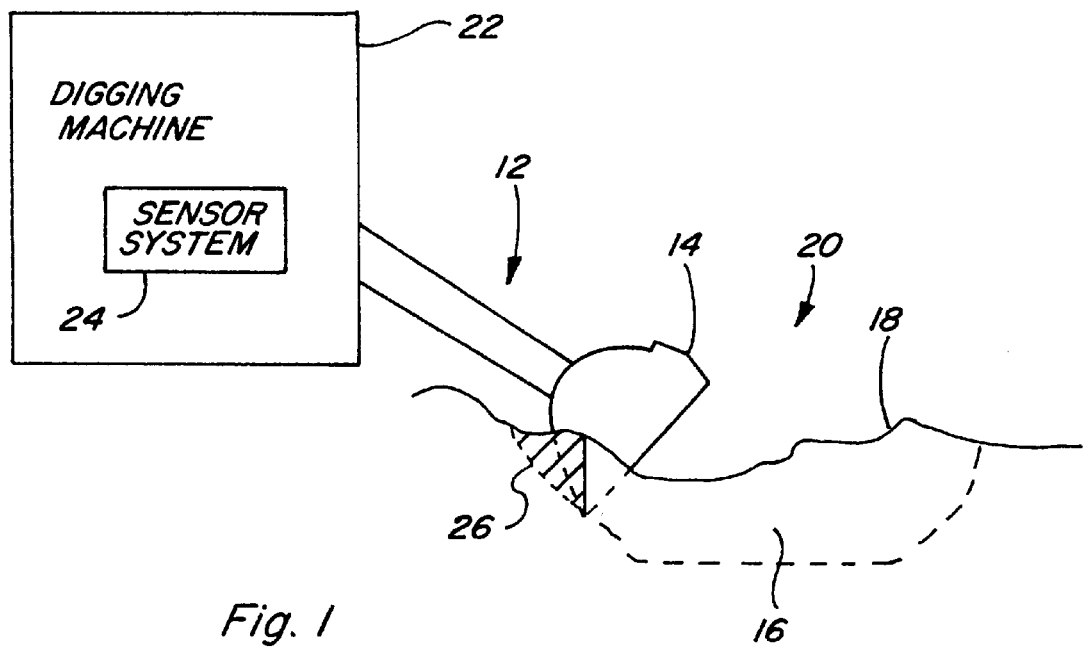
FIG. 1 is a side view of a work implement used in conjunction with the method of the present invention.
Figure 2:
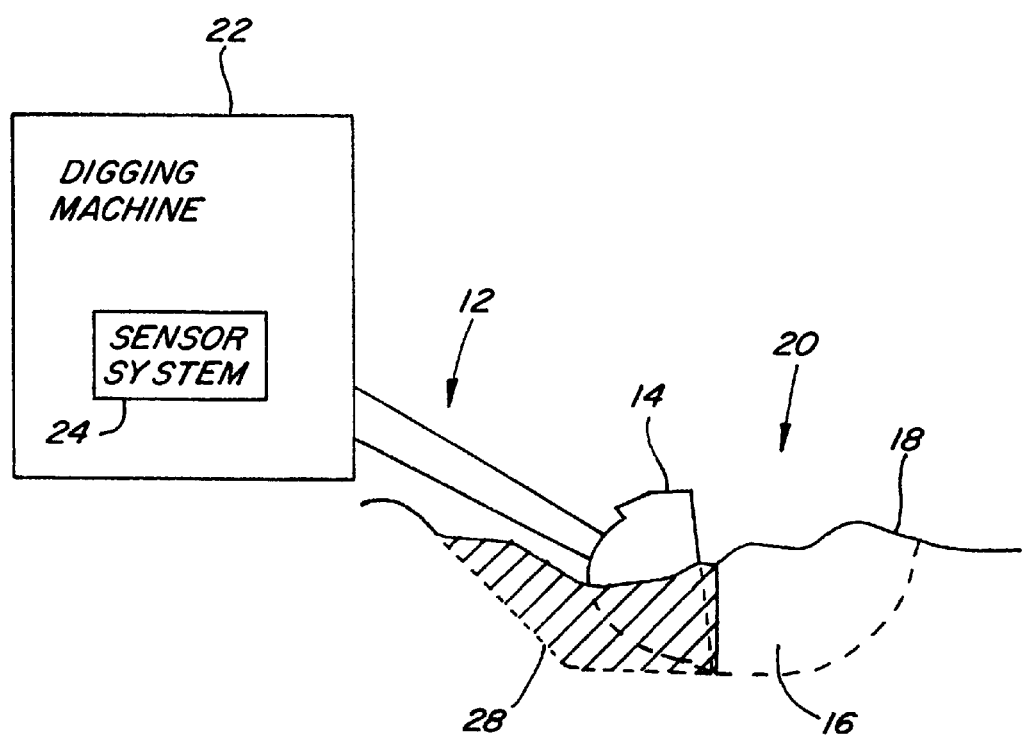
FIG. 2 is a side view of the work implement shown in FIG. 1 at the end of an excavation work cycle.

Referring now to the drawings, FIGS. 1 and 2 illustrate a portion of a work implement 12 having a bucket 14 which is used to dig material 16 from terrain 18 in a work site 20. The work implement 12 is controlled by or part of a digging machine 22. The digging machine 22 is equipped with a sensor system 24, which may consist of one or more scanning rangefinders, such as laser or radar, which is used to provide information regarding the shape of the terrain 18 prior to executing a digging operation at the work site 20. Although the sensor system 24 is shown as being part of the digging machine 22, it is also possible to provide a sensor system 24 which is separate from the digging machine 22.

The bucket 14 is shown in FIGS. 1 and 2 moving through the terrain 18. As the bucket 14 moves, all soil or material 16 above the tip of the bucket 14 is cut from the terrain 18 and added to the volume in the bucket 14. Prior to digging the material 16, the sensor system 24 is used to determine the shape of the terrain 18. As the bucket 14 passes through the soil or material 16, the volume that is swept over the front edge of the bucket 14 is being continually computed or estimated. This is accomplished through the following steps or method. As the work implement 12 moves during the digging stroke, the position and orientation of the bucket 14 with respect to the estimated shape of the terrain 18 is computed through kinematic transforms. The intersection of the trajectory of the bucket 14 with the terrain 18 is computed to determine the amount of soil or material 16 displaced during digging. Once it has been determined that the bucket 14 has reached a desired capacity, such as for example a fully loaded bucket 14, the digging machine 22 stops digging and then moves the captured material. The shaded portions or areas 26 and 28 shown in FIGS. 1 and 2, respectively, indicate the estimated soil displaced.

Figure 3:
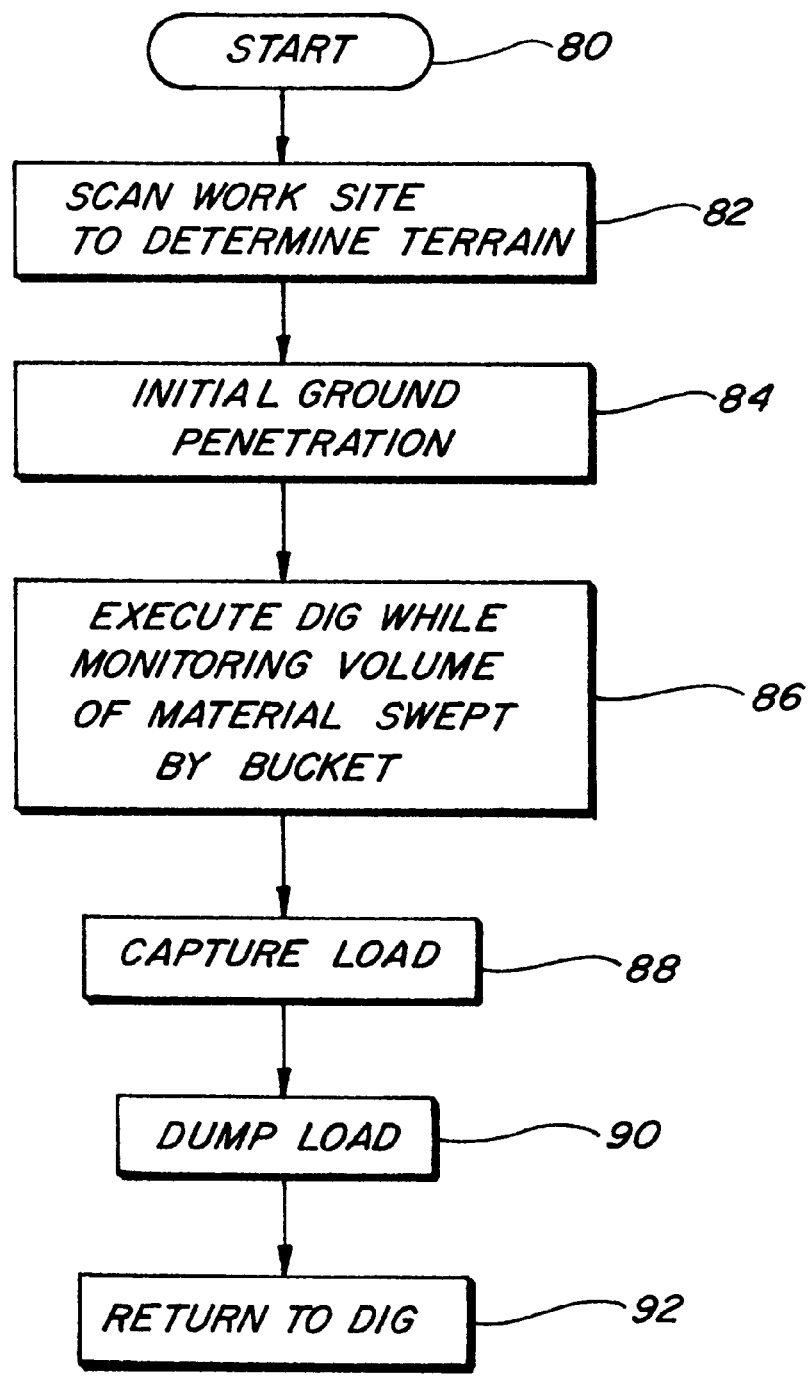
FIG. 3 is a block diagram of the method of the present invention.

Referring now to FIG. 3, a block diagram of the method of the present invention is shown. The method starts at a first step 80 and continues to a second step 82 in which the sensor system 24 is used to scan the work site 20 to determine the shape of the terrain 18. Once the shape of the terrain 18 has been produced, which may include the step of producing a topological map of the terrain 18 to be excavated, the ground is penetrated with the bucket 14 as shown in a step 84. In the step 82 it is also possible that the range data may be converted into a topological map of the terrain 18. A 2-D array to represent the height field may be used. As the work implement 12 moves during the digging stroke, as indicated by a step 86, the position and orientation of the bucket 14 with respect to the estimated shape of the terrain 18 is compute through kinematic transforms. By intersecting the trajectory of the bucket 14 with the terrain 18 the method uses a three dimensional (3-D) integration to compute the amount of soil or material 16 displaced during digging. As an example, a Gaussian quadrature integration could be used to calculate the volume. In this manner, it is possible to estimate or compute the volume of material inside the bucket 14.

When the method determines that the dig stroke is complete, a capture load step 88 is performed and the captured load is then dumped into, for example a truck, by use of a dump load step 90. Once the load has been dumped, the method may return to digging again, as is seen in a return to dig step 92.

Such a method can ensure that enough material is swept by the bucket 14 as well as that not too much soil or material 16 is swept because any bucket will have a finite capacity. The amount of volume swept can be used by an existing control, such as an automatic control, to modify the trajectory of the work implement 12 to dig further into the ground or to stop digging. For manually operated machines 22 in which an operator is remotely located from the machine 22 or cannot see the dig face or the bucket 14, a graphical user interface, such as a screen or monitor, can be used to display how much soil has been swept or to display the estimated volume of material. The display can also indicate as a percentage of bucket capacity how much material has been swept into the bucket 14. Additionally, an audible indicator, such as an audible alarm, may be used to indicate to when the bucket has reached a desired capacity.

Figure 4:
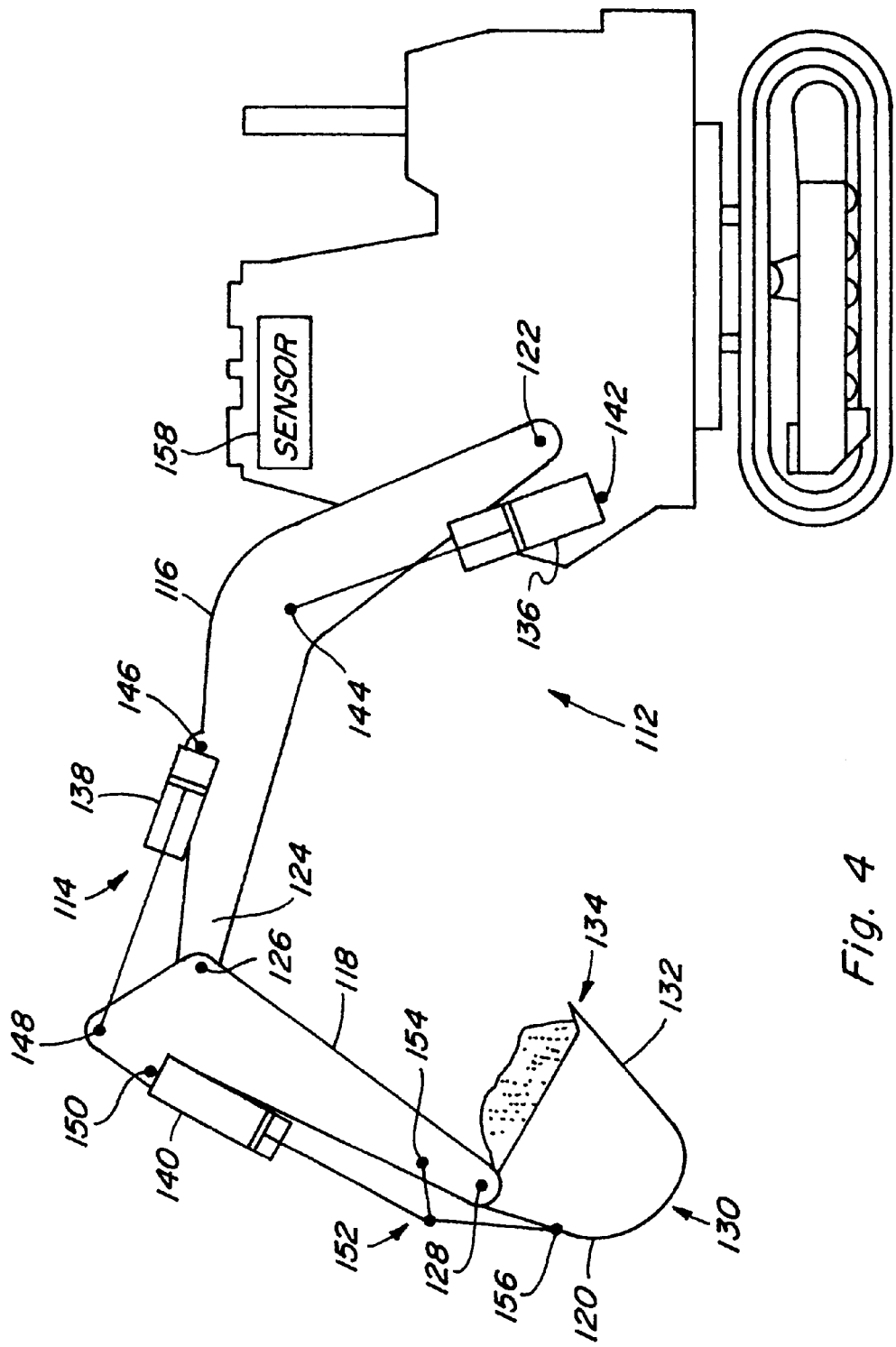
FIG. 4 is a side view of an excavating machine used in conjunction with the method of the present invention

The above described method and system may be employed in various type digging machines. In particular, FIG. 4 illustrates an excavating machine 112 which includes a work implement 114 which performs digging or loading functions. The work implement 114 includes a boom 116, a stick 118, and a bucket 120. The boom 116 is pivotally mounted on the excavating machine 112 by a boom pivot pin 122. The stick 118 is pivotally connected to a free end 124 of the boom 116 at a stick pivot pin 126. The bucket 120 is also pivotally attached to the stick 118 at a bucket pivot pin 128. The bucket 120 includes a rounded portion 130, a floor 132, and a tip 134. The boom 116, stick 118, and bucket 120 are independently and controllably actuated by linearly extendable hydraulic cylinders 136, 138, and 140, respectively. In particular, the boom 116 is actuated by the hydraulic cylinder 136 for upward and downward movements of the stick 116. The boom hydraulic cylinder 136 is connected between the machine 112 and the boom 116 at a pair of pins 142 and 144. The stick 118 is actuated by the stick hydraulic cylinder 138 for longitudinal horizontal movements of the bucket 120. The stick hydraulic cylinder 138 is connected between the boom 116 and the stick 118 by a pair of pins 146 and 148. The bucket 120 is actuated by the bucket hydraulic cylinder 140 and has a radial range of motion about the bucket pivot pin 128. The bucket hydraulic cylinder 140 is connected to the stick 118 at a pin 150 and to a linkage 152. The linkage 152 is connected to the stick 118 at a pin 154 and to the bucket 120 at a pin 156.

The operation of the work implement 114 and the hydraulic cylinders 136, 138, and 140 encompasses the following relationships. The boom 116 is raised by extending the boom hydraulic cylinder 136 and lowered by retracting the boom hydraulic cylinder 136. Retracting the stick hydraulic cylinder 138 moves the stick 118 away from the excavating machine 112 and extending the stick hydraulic cylinder 138 moves the stick 118 toward the machine 112. Finally, the bucket 120 is rotated away from the excavating machine 112 whenever the bucket hydraulic cylinder 140 is retracted and the bucket 120 may be rotated toward the machine 112 by extending the hydraulic cylinder 140.

The excavator 112 is equipped with a sensor system 158, which may consist of one or more scanning rangefinders, which is positioned to provide information regarding the shape of the terrain prior to executing a dig. The range data produced or generated by the sensor system 158 may be converted into a topological map of the terrain. A two dimensional (2-D) array may be used to represent the height field. Additionally, as the work implement 114 moves, its position and orientation with respect to the estimated shape of the terrain may be computed through kinematic transforms. The sensor system 158 may be integrated within a control system (not shown) which receives data acquired by the sensor system 158 to process and create a terrain map of the excavation site.

A typical automated excavating work cycle or digging process for the excavating machine 112 can be partitioned into five sequential steps. The five steps are positioning the bucket 120 into the ground or soil, digging, capturing the material, dumping the captured load into a truck, and then return to digging. The method of the present invention is used to determine when the digging operation or process may be stopped once it is determined that the bucket is full or has reached a desired capacity. Additionally, the method of the present invention is used to indicate to an operator of a manually or a remotely operated digging machine when the bucket has reached a desired capacity.

Industrial Applicability

The operation of the present invention is best described in relation to its use in earthmoving machines or equipment such as excavators, backhoe loaders, front shovels, or wheel loaders. The earthmoving machine may include a means for controlling the machine through the digging portion of the work cycle.

Prior to initiating the digging portion of the work cycle, some method is used to capture the shape of the terrain such as with a laser range finding system. The shape of the terrain is utilized to estimate the swept volume of material given the actual trajectory of the bucket. It is recognized that this method may have some sources of inaccuracy. For example, one source of inaccuracy is attributed to the assumption that the soil face does not change from the time that the perceptual image is taken to the time that the bucket edge passes beneath it. Another source would be the assumption that the material that passes over the front edge of the bucket stays within the bucket. In actuality, some of the soil or material falls off to the side of the bucket as digging progresses. In order to compensate, it is sufficient to account for this spillage by overestimating the capacity of the bucket. Additionally, visual occlusions in the dig face can cause inaccuracies when integrating the volume. By careful positioning of the machine and by interpolation, these inaccuracies can be minimized.

There are several applications for this methodology with earthmoving equipment, excavation equipment, or digging machines. This method may be used in a machine that is capable of automatically executing a digging cycle without human intervention, and thus be used to dictate when to end the cycle. Alternatively, the method could be used to provide to a human machine operator, who is either operating the machine directly or remotely, when the bucket has reached the desired capacity and to stop digging.

The present invention, as previously described, is also for various other type hydraulically driven machines at an earthmoving site with such machines including excavators, wheel loaders, compactors, bulldozers, as well as mining, construction, exploration, inspection, and agricultural machinery.

Other aspects, objects and advantages of the present invention can be obtained from a study of the drawings, the disclosure and the appended claims.

What is claimed is:

1. A method for monitoring a work implement of a digging machine positioned at an excavation site during an excavating work cycle, the work implement including a bucket for capturing material, the method comprising the steps of:

using a representation of the shape of the excavation site; and estimating the volume of material captured by the bucket based on the actual trajectory of the bucket and the shape of the excavation site to determine when the bucket has reached a desired capacity.

2. The method of claim 1 wherein the estimating step further includes the step of computing the amount of material displaced by the bucket.

3. The method of claim 2 wherein the estimating step further includes the step of finding the intersection between the trajectory of the bucket and the excavation site and computing the displaced volume.

4. The method of claim 1 wherein the estimating step further includes the steps of providing a graphical user interface and displaying the estimated volume of material on the graphical user interface.

5. The method claim 1 wherein the estimating step further includes the step of augmenting existing control of the work implement to control how much material is swept during an excavating work cycle.

6. The method of claim 1 wherein the determining step further includes the step of providing a sensor system to sense the shape of excavation site.

7. A method for monitoring a work implement of a digging machine positioned at an excavation site during an excavating work cycle, the work implement including a bucket, the method comprising the steps of:

producing a topological map of the excavation site to be excavated prior to commencing operation of the work implement; and estimating the swept volume of the bucket given the actual trajectory of the bucket and the shape of the excavation site.

8. The method of claim 7 wherein the estimating step further includes the step of computing the amount of material displaced by the bucket.

9. The method of claim 7 wherein the estimating step further includes the step of finding the intersection between the bucket trajectory and the excavation site and computing the displaced volume.

10. The method of claim 7 wherein the estimating step further includes the steps of providing a graphical user interface and displaying the estimated swept volume on the graphical user interface.

11. The method of claim 7 wherein the estimating step further includes the step of augmenting existing control of the work implement to control how much volume of material is swept during a work cycle.

12. The method of claim 7 wherein the producing step further includes the step of providing a sensor system to sense the shape of terrain in the work site.

13. The method of claim 7 wherein the producing step further includes the steps of generating range data and converting the range data into a topological map of the excavation site.

14. A method for monitoring a work implement of a digging machine positioned at an excavation site during an excavating work cycle, the work implement including a bucket, the method comprising the steps of:

producing a topological map of the initial excavation site;

determining the position of the work implement; and estimating the volume of material captured by the bucket to determine when the bucket has reached a desired capacity.

15. The method of claim 14 wherein the estimating step further includes the step of computing the amount of material captured.

16. The method of claim 14 wherein the estimating step further includes the steps of providing a graphical user interface and displaying the estimated volume of material captured by the bucket on the graphical user interface.

17. The method of claim 14 wherein the estimating step further includes the step of finding the intersection between the trajectory of the bucket and the excavation site and computing the displaced volume.

18. The method of claim 14 wherein producing step further includes the step of providing a sensor system to sense the shape of the excavation site.

19. The method of claim 14 wherein the estimating step further includes the step of augmenting existing control of the work implement to control how much volume of material is swept during a work cycle.

20. The method of claim 14 wherein the producing step further includes the steps of generating range data and converting the range data into the topological map.

* * * * *

UNITED STATES PATENT AND TRADEMARK OFFICE
CERTIFICATE OF CORRECTION

PATENT NO. : 6,085,583
DATED : July 11, 2000
INVENTOR(S) : Cannon et al

Page 1 of 1

It is certified that error appears in the above-identified patent and that said Letters Patent is hereby corrected as shown below:

In the BEST MODE FOR CARRYING OUT THE INVENTION;
Column 3,
Line 3, please delete "compute" and insert "computed".

In INDUSTRIAL APPLICABILITY;
Column 4,
Line 31, please delete "Industrial Applicability" and insert "INDUSTRIAL APPLICABILITY" centered as a heading as the rest of the headings are formatted.

Signed and Sealed this

Twelfth Day of June, 2001

*Attest:*

NICHOLAS P. GODICI
*Attesting Officer*     *Acting Director of the United States Patent and Trademark Office*